United States Patent [19]

Kennedy et al.

[11] 4,214,978
[45] Jul. 29, 1980

[54] CATALYTIC CRACKING

[75] Inventors: James V. Kennedy, Westfield; Lawrence B. Dight, High Bridge, both of N.J.

[73] Assignee: Engelhard Minerals & Chemicals Corporation, Menlo Park, N.J.

[21] Appl. No.: 42,918

[22] Filed: May 29, 1979

Related U.S. Application Data

[60] Division of Ser. No. 958,550, Nov. 8, 1978, Pat. No. 4,171,286, which is a continuation of Ser. No. 757,828, Jan. 10, 1977, abandoned.

[51] Int. Cl.² .................. C10G 11/04; B01J 8/24; B01J 23/64
[52] U.S. Cl. ............................ 208/120; 208/121; 252/417
[58] Field of Search .................... 208/120, 121; 252/411 R, 455 R, 455 Z, 417

[56] References Cited

U.S. PATENT DOCUMENTS

| 2,426,927 | 3/1948 | Kassel | 252/417 |
|---|---|---|---|
| 2,647,860 | 8/1953 | Plank et al. | 208/120 |
| 2,651,598 | 9/1953 | Ciapetta | 252/460 X |
| 2,840,532 | 6/1958 | Haensel | 208/138 |
| 3,364,136 | 1/1968 | Chen et al. | 208/120 |
| 3,647,718 | 3/1972 | Haden et al. | 252/455 Z |
| 3,746,659 | 7/1973 | Horzepa | 252/455 R |
| 4,072,600 | 2/1978 | Schwartz | 208/120 |
| 4,115,250 | 9/1978 | Flanders et al. | 208/120 |
| 4,148,751 | 4/1979 | Hemler et al. | 208/120 X |
| 4,153,535 | 5/1979 | Vasalos et al. | 208/120 |

FOREIGN PATENT DOCUMENTS 2507343  9/1975 Fed. Rep. of Germany ........... 208/120

*Primary Examiner*—Delbert E. Gantz
*Assistant Examiner*—G. E. Schmitkons
*Attorney, Agent, or Firm*—Inez L. Moselle

[57] ABSTRACT

A novel particulate material for promoting combustion of carbon monoxide to carbon dioxide in the regeneration zone of a cyclic fluid cracking process without substantially affecting the ability of separate fluid cracking catalyst particles containing an active crystalline zeolitic aluminosilicate component to catalyze the hydrocarbon conversion reaction in the conversion zone. The novel promoter particles comprise coherent, catalytically inert microspheres of calcined kaolin clay having a $SiO_2/Al_2O_3$ molar ratio of about 2/1, a surface area (B.E.T.) in the range of about 10 to 15 m²/g., a pore volume (as determined by nitrogen absorption) in the range of about 0.02 to 0.04 cc./g., the calcined microspheres being impregnated with a trace amount of a platinum compound and being free from a component capable of cracking hydrocarbons in the absence of added hydrogen.

2 Claims, No Drawings

CATALYTIC CRACKING

RELATED APPLICATION

This is a division of copending application Ser. No. 958,550, filed Nov. 8, 1978 (now U.S. Pat. No. 4,171,286), which is a continuation of Ser. No. 757,828, filed Jan. 10, 1977, now abandoned.

BACKGROUND

1. Field of the Invention

This invention relates to the well-known continuous cyclic fluid catalytic cracking (FCC) of hydrocarbons with a catalyst, generally a catalyst containing a crystalline aluminosilicate zeolite component, in the absence of added hydrogen to produce gasoline, which cracking results in the formation on the catalyst particles of a deposit of combustible hydrocarbons known as coke, and the spent catalyst particles from the catalytic reactor are regenerated in a separate zone by burning off sufficient coke to place the catalyst particles in a condition suitable for recycling to the hydrocarbon conversion zone. In particular the invention is concerned with a solid additive capable of promoting combustion of carbon monoxide to carbon dioxide in FCC regenerates without appreciably affecting the ability of the catalyst particles to catalyze the hydrocarbon conversion reaction in the conversion cycle.

Present-day continuous cyclic FCC processes utilize fluidizable catalyst particles containing a crystalline aluminosilicate component (usually an ion-exchanged form of a synthetic faujasite such as zeolite X or Y) and a porous inorganic oxide matrix. This type of catalyst must be regenerated to low carbon levels, typically 0.5% or less, to assure required activity and selectivity before the catalyst particles can be recycled to a conversion zone. In most regenerators, the combustible solids deposited on the spent solid catalyst particles from the cracking zone are burned in a confined regeneration zone in the form of a fluidized bed which has a relatively high concentration of catalyst particles (dense phase). A region of lower solids concentration (light phase) is maintained above the dense phase. A typical regeneration cycle is described in U.S. Pat. No. 3,944,482 to Mitchell.

High residual concentrations of carbon monoxide in flue gases from regenerators have been a problem since the inception of catalytic cracking processes. The evolution of FCC has resulted in the use of increasingly high temperatures in FCC regenerators in order to achieve the required low carbon levels in the regenerated crystalline aluminosilicate catalysts. Typically regenerators now operate at temperatures in the range of 1100° to 1350° F. and result in flue gases having a $CO_2/CO$ ratio in the range of 1.5 to 0.8. The oxidation of carbon monoxide is highly exothermic and can result in so-called "carbon monoxide afterburning" which can take place in the dilute catalyst phase, in the cyclones or in the flue gas lines. Afterburning has caused significant damage to plant equipment. On the other hand, unburned carbon monoxide in atmosphere-vented flue gases represents a loss of fuel value and is ecologically undesirable.

Restrictions on the amount of carbon monoxide which can be exhausted into the atmosphere and the need for efficient coke removal from spent catalyst particles have stimulated several approaches to the provision of means for achieving a balance between afterburning and incomplete regeneration of spent fluid zeolitic catalysts.

It is well known that metals such as iron, nickel, vanadium and copper can promote carbon monoxide combustion when present as contaminants in cracking feedstocks. Early in the development of catalytic cracking and long prior to the introduction of crystalline zeolitic aluminosilicate catalysts, it was proposed (U.S. Pat. No. 2,436,927 to Kassel) to prevent afterburning in fluidized catalytic cracking processes by introducing a small amount of a carbon monoxide oxidizing catalyst. The proposed oxidant was an oxide of metals from the first transition series. It was suggested to introduce such material either as a component of the cracking catalyst or, preferably, as separate particles supported "on a suitable carrier". Such carrier was not described in the patent. Chromium oxide was proposed as an imprenant for gel-type moving bed cracking catalysts in U.S. Pat. No. 2,647,860 to Plank et al. This was also prior to the introduction of crystalline zeolitic catalysts. Subsequently it was suggested to incorporate titanium in cracking catalysts for improved carbon monoxide conversion but this approach was directed to achieve only partial combustion of carbon monoxide since regenerators available at that time were not capable of withstanding the heat release resulting from full combustion.

U.S. Pat. No. 3,364,136 to Chen suggested the use of a noble metal such as platinum to promote carbon monoxide oxidation in a regenerator of an FCC unit operated with a zeolitic aluminosilicate catalyst. According to the teachings of the patent, the noble metal had to be held within the inner pore structure of a so-called "shape selective" zeolite, specifically a zeolite having pores large enough to allow penetration of oxygen, carbon monoxide and carbon dioxide but too small for molecules of gas-oil. In one preferred embodiment, the particles of shape selective zeolite containing the oxygen promoter within the pores were contained in the same particles which included both the larger pore catalytically active zeolite and a conventional inorganic oxide matrix component. For example, the two different zeolites, one including a promoter such as platinum within the pores, were composited into unitary particles with an inorganic oxide matrix material. An alternative disclosed in the Chen patent involved mixing the particles of sieve containing the oxidation promoter with particles of the zeolitic catalyst. In a preferred embodiment of this alternative, the individual components were of different particle size so that the oxidation component could be withdrawn as well as added to the circulating catalyst mass to alter the degree of carbon monoxide conversion. In all variations of this technology, preparation of a costly small pore zeolitic component is required and the oxidant will be present on a high surface area support.

According to the teachings of West German Application DT No. 2444911 (Equivalent to U.S. Pat. No. 4,072,600 to Schwartz), small amounts of metal or metallic elements of Period 5 and 6 of Group VIII of the Periodic Table or rhenium or compounds thereof are simply added in amounts up to 50 p.p.m. to conventional FCC (or TCC) catalysts to decrease the carbon monoxide content of flue gases, as evidenced by the improved $CO_2/CO$ ratio of such gases, without appreciably affecting the cracking properties of the catalysts. The metal component, preferably a platinum compound, is introduced into the catalyst by impregnation or by ion exchange during any stage of catalyst manufacture, or even after the catalyst particles are formed. According to the teachings of the German patent application, the active cracking catalyst component (zeolitic aluminosilicate) is preferably ion-exchanged with the metal and the ion-exchanged material is composited with the porous matrix to produce catalyst particles. The German application also discloses that a silicon-containing support or clay can be ion-exchanged or impregnated with the metal but there is no explanation as to how this is accomplished. Based on illustrative examples, a reasonable interpretation is that the exchanged support or clay is mixed with the catalytically active zeolite component to form composite catalyst particles in which the metal promoter and active zeolite are present in the same properties.

The patented techniques for preparing a platinum metal promoted cracking catalyst leave something to be desired. Impregnation or ion-exchange of the zeolite or the porous matrix before compositing the constituents can be used only in the production of those catalysts in which the zeolite is formed separately from the matrix; for example, catalysts prepared as described in U.S. Pat. No. 3,140,249 and 3,140,253 to Plank et al. When a finished catalyst is treated, the entire tonnage of catalyst must be processed. Similarly, the entire catalyst must be treated with a metal when the catalyst particles are produced in situ from preforms, such as catalysts produced in accordance with the teachings of U.S. Pat. No. 3,647,718 to Haden et al. By way of example, in Example 10 of the DT No. 2444911 application, a promoted FCC catalyst was prepared containing 3 p.p.m. platinum by impregnating a clay-based catalyst with a solution of platinum-tris (ethylenediamine) tetrachloride followed by washing and drying. Using this technique on a commercial basis, the production of 10,000 tons of metal-promoted catalyst would require the use of about 35,000 tons of platinum solution to incorporate the desired amount of platinum. This would necessitate a substantial capital investment for equipment for impregnation, washing and drying. Prior to our invention, the suggestion was made that the platinum oxidation might be incorporated on a solid support material. Presumably, a conventional high surface area gel-type catalyst was intended as the support.

A general object of the invention is to provide improvements in prior art means for achieving controlled oxidation of carbon monoxide in the regeneration zone of a cyclic FCC process.

THE INVENTION

The essence of the present invention resides in promoting the combustion of carbon monoxide in an FCC regenerator by the use of an additive obtained by uniformly impregnating a small amount of solution of a platinum compound on coherent fluidizable particles of kaolin clay calcined to a substantially anhydrous condition and having a low surface area (in the range of about 10 to 15 $m^2/g$. as determined by the B.E.T. nitrogen absorption method) and a total pore volume as determined by nitrogen absorption in the range of about 0.02 to 0.04 cc/g., said particles being free from a component having appreciable ability to crack hydrocarbons. The amount of platinum compound present in the particles is generally in the range of about 5 to 150 p.p.m., most usually in the range of 50 to 100 p.p.m., expressed as platinum metal.

Another aspect of the invention comprises a cracking catalyst for use in a cyclic FCC cracking process, the catalyst being a mixture of a major weight percentage, preferably at least 90% by weight, of particles of a conventional zeolitic aluminosilicate FCC catalyst and a minor amount of separate particles of said platinum impregnated microspheres of calcined clay, the latter being present in amount such that the platinum content of the mixture is in the range of 1 to 50 p.p.m., preferably in the range of about 1 to 5 p.p.m.

Still another aspect of the invention comprises an improvement in a conventional cyclic FCC process carried out in the absence of added hydrogen. The improvement comprises the use of a catalyst which is a mixture of fluidizable particles of a conventional zeolitic catalyst and separate particles of the novel oxidation promoter of the invention, the mixture being introduced into a cracking zone and subsequently regenerated in a separate regeneration zone by burning and recycled into a cracking zone. This embodiment of the invention is especially adapted for use in cracking units in which essentially complete combustion of carbon monoxide to carbon dioxide is feasible. However, the catalyst mixture may be useful in achieving partial controlled combustion in units in which complete combustion is not feasible; for example, in regenerators not capable of withstanding the high temperatures resulting from complete combustion.

The novel particulate promoter of the invention has the desirable properties of mechanical hardness (generally comparable to that of quality FCC zeolitic catalyst particles) and it is readily fluidized in conversion zones and in the regenerator. The base material for the promoter (calcined microspheres of kaolin clay) is relatively inexpensive. The apparent bulk density of such promoter (0.9 g./cc.) is similar to that of conventional equilibrium FCC catalysts and undesirable segregation of the promoter during storing, shipment or use of a mixture of the promoter and active FCC catalyst particles is minimized. Processing advantages over prior art methods involving impregnation or ion-exchange of the entire catalyst tonnage are self-evident. Only a fraction of the catalyst requires treatment and risks of platinum contamination and loss of platinum are minimized. In marked contrast to the separate promoter particles of the Chen patent (supra) which contain a high surface area zeolitic component, the promoter particles of this invention do not contain zeolite and they have a relatively low surface area.

An unexpected benefit of providing platinum-containing promoter and cracking catalyst in different particles, the promoter being impregnated on calcined microspheres of kaolin clay, is that the mixture is frequently more effective in promoting the oxidation of carbon monoxide to carbon dioxide in a regenerator than would be the case if the same quantity of platinum were impregnated on the particles of the active cracking catalyst.

DESCRIPTION OF PREFERRED EMBODIMENTS

The microspheres of calcined kaolin clay used in the production of the promoter particles are known in the art and are employed as a chemical reactant with a sodium hydroxide in the manufacture of fluid zeolitic cracking catalysts as described in U.S. Pat. No. 3,647,718 to Haden et al. In practice of the instant invention, in contrast, the microspheres of calcined kaolin clay are not used as a chemical reactant. Thus the chemical composition of the microspheres of calcined clay used in practice of this invention corresponds to that of a dehydrated kaolin clay. Typically, the calcined microspheres analyze about 51% to 53% (wt.) $SiO_2$, 41 to 45% $Al_2O_3$, and from 0 to 1% $H_2O$, the balance being minor amounts of indigenous impurities, notably iron, titanium and alkaline earth metals. Generally, iron content (expressed as $Fe_2O_3$) is about 1/2% by weight and titanium (expressed as $TiO_2$) is approximately 2%. It is reasonable to believe that the metallic impurities in kaolin clay which are present in the microspheres may contribute to the outstanding effectiveness of the platinum impregnated microspheres as a promoter for carbon monoxide oxidation.

The microspheres are preferably produced by spray drying an aqueous suspension of kaolin clay. The term "kaolin clay" as used herein embraces clays, the predominating mineral constituent of which is kaolinite, halloysite, nacrite, dickite, anauxite and mixtures thereof. Preferably a fine particle size plastic hydrated clay, i.e., a clay containing a substantial amount of submicron size particles, is used in order to produce microspheres having adequate mechanical strength.

To facilitate spray drying, the powdered hydrated clay is preferably dispersed in water in the presence of a deflocculating agent exemplified by sodium silicate or a sodium condensed phosphate salt such as tetrasodium pyrophosphate. By employing a deflocculating agent, spray drying may be carried out at higher solids levels and harder products are usually obtained. When a deflocculating agent is employed, slurries containing about 55 to 60% solids may be prepared and these high solids slurries are preferred to the 40 to 50% slurries which do not contain a deflocculating agent.

Several procedures can be followed in mixing the ingredients to form the slurry. One procedure, by way of example, is to dry blend the finely divided solids, add the water and then incorporate the deflocculating agent. The components can be mechanically worked together or individually to produce slurries of desired viscosity characteristics.

Spray dryers with countercurrent, cocurrent or mixed countercurrent and cocurrent flow of slurry and hot air can be employed to produce the microspheres. The air may be heated electrically or by other indirect means. Combustion gases obtained by burning hydrocarbon fuel in air can be used.

Using a cocurrent dryer, air inlet temperatures to 1200° F. may be used when the clay feed is charged at a rate sufficient to produce an air outlet temperature within the range of 250° F. to 600° F. At these temperatures, free moisture is removed from the slurry without removing water of hydration (water of crystallization) from the raw clay ingredient. Dehydration of some or all of the raw clay during spray drying is, however, within the scope of the invention. The spray dryer discharge may be fractionated to recover microspheres of desired particle size. Typically particles having a diameter in the range of 20 to 150 microns are preferably recovered for use in preparing the support for the platinum promoter.

While it is preferable in some cases to calcine the microspheres at temperatures in the range of about 1600° F. to 2100° F. in order to produce particles of maximum hardness, it is possible to dehydrate the microspheres by calcination at lower temperatures; for example, temperatures in the range of 1000° F. to 1600° F., thereby converting the clay into the material known as "metakaolin". After calcination the microspheres should be cooled and fractionated, if necessary, to recover the portion which is in the desired size range.

Pore volume of the microspheres will vary slightly with the calcination temperature and duration of calcination. Pore size distribution analysis of a representative sample obtained with a Desorpta analyzer using nitrogen desorption indicates that most of the pores have diameters in the range of 150 to 600 Angstrom units.

The surface area of the calcined microspheres is usually within the range of 10 to 15 $m^2/g$. as measured by the well-known B.E.T. method using nitrogen absorption. It is noted that the surface areas of commercial fluid zeolitic catalysts are considerably higher, generally exceeding values of 100 $m^2/g$. as measured by the B.E.T. method.

Simple impregnation of the calcined microspheres with an aqueous solution of a soluble platinum compound will suffice to achive uniform deposition of the trace platinum compound on the spray dried calcined microspheres since these microspheres have adequate porosity for uniform deposition of trace amounts of an impregnant. However, the porosity of the calcined microspheres is sufficiently low to minimize coke deposition in the cracking zone of a FCC unit.

The platinum compound may be one in which the platinum is in the anion, such as for example chloroplatinic acid, or the platinum may be in the cation, such as for example Pt (ethylene diamine) $Cl_4$. During impregnation, the microspheres should be agitated. Preferably the solution of platinum compound is applied by means of a spray. Provided the platinum compound is applied as an aqueous solution of sufficiently high concentration, a drying step will be optional after impregnation. Before use or during use, the platinum impregnated microspheres are contacted with hot air or steam, possibly converting the platinum compound to an oxide. Any conventional method for impregnating platinum on inorganic support material may be used and sources of platinum other than the specific materials mentioned above may be employed. DT 2444911 (supra), U.S. Pat. No. 2,840,514 to Brennan et al., U.S. 2,840,532 to Haensel and U.S. 2,971,904 to Gladrow et al set forth procedures that can be used. Such procedures are modified when necessary to reduce the amount of impregnated platinum to levels suitable for practice of this invention.

The amount of platinum deposited on the microspheres will depend inter alia on the proportion of impregnated microspheres to be blended with separate particles of active cracking catalyst and whether complete or partial combustion of carbon monoxide is desired. Generally, from 70 to 95 parts by weight of catalytically active cracking catalyst particles are mixed with 30 to 5 parts by weight of the platinum impregnated microspheres. Preferably the platinum impregnated microspheres constitute 10% by weight or less of the total mixture since the presence of more than 10% of the promoter particles may result in an appreciable decrease in the cracking activity of the catalyst. Use of less than about 3 to 5% platinum impregnated microspheres can result in difficulties in securing uniform blends. In general, the use of about 4 to 7% impregnated microspheres is especially preferable.

The level of platinum in a blend of promoter particles and separate catalyst particles is usually in the range of 3 to 10 p.p.m. (based on the total mixture) when full combustion is desired. From 0.5 to 3 p.p.m. may be used for partial combustion. A suitable level of platinum will vary with the design of a particular regeneration system.

In an illustrative example, microspheres of calcined kaolin clay were produced using a fine particle size uncalcined paper coating grade of hydrated Georgia Kaolin clay as a starting material. The clay was formed into a slurry of about 60% sollids using tetrasodium pyrophosphate in amount of 0.5% of the clay weight as a deflocculating agent. The slurry was spray dried and calcined at a temperature of about 1900° F. to an essentially anhydrous condition. The calcined spray dried microspheres were screened to recover a desired fraction which had the following particle size distribution:

| Tyler Screen | Wt. % |
|---|---|
| +100 | 1-2 |
| −100 + 200 | 35-50 |
| −200 + 325 | 30-48 |
| −325 | 16-18 |

Surface area was 12.8 m$^2$/g. (B.E.T. method, using nitrogen as an absorbate). Pore volume (nitrogen absorption) was 0.026 cc./gm.

A 600 gram charge of the microspheres was placed in a Tefloncoated 1½ gallon can provided with flights. The can was rotated slowly (35 r.p.m.) while an aqueous solution of chloroplatinic acid containing 400 p.p.m. Pt was sprayed as a fine mist into the open drum. The concentration and amount of impregnating solution were calculated to incorporate 60 p.p.m. of platinum on the support without increasing the L.O.I. (loss on ignition as determined at 1800° F.) above 13.7%.

A sample of the impregnated microspheres of calcined clay (5 parts by weight) was blended with particles of HFZ-20 ® cracking catalyst (95 parts by weight). The mixture (identified as Sample A) has a platinum content of 3 p.p.m.

For purposes of comparison another sample of HFZ-20 cracking catalyst was impregnated with the solution of chloroplatinic acid in generally the same manner to provide a catalyst containing 3 p.p.m. Pt except that the amount of concentration of chloroplatinic acid were increased. The catalyst sample is identified as Sample B.

A sample of HFZ-20 without a promoter was identified as Sample C. A typical sample of HFZ-20 analyzes 0.9% Na$_2$O, 37.0% SiO$_2$, 59.3% SiO$_2$, 2.4% TiO$_2$, 0.61% Fe$_2$O$_3$ and 13.0% L.O.I. Surface area is above 300 m$^2$/g. before steaming.

Catalysts A, B and C were activated and aged by calcination at 1400° F. and 1500° F. for 4 hours in an atmosphere of 100% steam and the steamed catalysts were used in cracking gas-oil feedstock in a microactivity test unit. It was found that with the exception of a slight increase in hydrogen make, catalysts A and B had substantially the same activity and selectivity as catalyst C. Thus, the presence of platinum did not materially affect the activity and selectivity of the HFZ-20 catalyst.

In order to determine whether the catalysts containing added platinum (A and B) were capable of promoting the oxidation of carbon monoxide to carbon dioxide, the following carbon monoxide conversion test was carried out with samples of catalysts A, B and C steamed at 1400° F. for 4 hours in an atmosphere of 100% steam.

To carry out the test, a fluidized bed of the sample was brought to a temperature of 1215° F. in the presence of helium and a gas contaning carbon dioxide (8%), carbon monoxide (4%) and oxygen (4%) was injected through the catalyst. After a steady state was established, a chromatograph was used to determine the CO$_2$/CO ratio in the effluent gas. Catalysts A and B, both containing impregnated platinum, converted essentially all of the carbon monoxide to carbon dioxide, while the control (catalyst C) converted 22% of the carbon monoxide. Thus, the carbon monoxide conversion test indicated that uncoked catalysts A and B were capable of catalyzing carbon monoxide burning.

To compare the effectiveness of platinum promoters during regeneration, spent catalyst A was mixed with fresh catalyst A (steamed at 1400° F.) to provide a blend containing 0.65% coke. The same was done with catalysts B and C. To stimulate regeneration, a 3 to 4 gram sample of each spent (coked) catalyst was fluidized and heated to 1215° F. in a helium atmosphere. Air was then passed through the fluidized bed at a constant flow rate of 215 cc./min. for 5 minutes to burn off the coke. The gas was collected and the CO$_2$/CO ratio was determined by gas chromatography.

Results are summarized below in table form.

| | EFFECT OF PLATINUM ON REGENERATION OF SPENT FCC CATALYST | |
|---|---|---|
| | Sample | CO$_2$/CO Ratio Upon Regeneration |
| A- | 95% HFZ-20 & 5% Pt impregnated calcined microspheres of kaolin clay, 3 p.p.m. Pt | 63 |
| B- | HFZ-20 impregnated with 3 p.p.m. Pt | 49 |
| C- | HFZ-20-no Pt | 1.3 |

Data for the regeneration test show that when catalysts A and B were used to promote oxidation of carbon monoxide during conditions stimulating regeneration of a coked catalyst, the catalyst of the invention (catalyst A) was significantly more effective than the catalyst containing the same amount of platinum impregnated directly on the catalyst particles (catalyst B). As mentioned above, the data for the CO conversion test show that prior to coking, catalysts A and B were both capable of catalyzing fully the oxidation of carbon monoxide at 1215° F. Since the surface area of the calcined kaolin support for the platinum in catalyst A is only about 13 m$^2$/g. while the surface area of the support for the platinum in catalyst B is over 300 m$^2$/g., a reasonable explanation for the superiority of catalyst A is that less coke is present on the support particles of catalyst A during regeneration with the result that the platinum is accessible for a longer period during regeneration to burn carbon monoxide. On the other hand, it is conceivable that the porous microstructure (minus 100 Angstrom pores) of a zeolitized HFZ-20 microsphere or conventional cracking catalyst is such that when the platinum is ionexchanged or impregnated thereon (into a zeolitized microsphere) the platinum becomes less readily accessible and a diffusion controlled mechanism may prevail, thus hindering burn-off of CO to CO$_2$.

Results similar to those detailed above were realized when the platinum impregnated microspheres were blended with other zeolitic cracking catalysts containing a type Y zeolite component, including catalysts containing rare earth metals.

It is intended that the invention should not be limited to the details of the examples but broadly as defined in the appended claims.

We claim:

1. In a process for the continuous cyclic fluid catalytic cracking of hydrocarbons with a zeolitic cracking catalyst in the absence of added hydrogen in a reaction zone to produce lower boiling hydrocarbons wherein cracking results in the deposition on the fluid cracking catalyst particles of a solid deposit of combustible hydrocarbons, the catalyst particles containing said deposit are regenerated in a regeneration zone by oxidation in the presence of air at elevated temperature to burn off said deposit, and the catalyst is recycled to said reaction zone where it is used to crack hydrocarbons in the absence of added hydrogen, the improvement which comprises cycling said particles of cracking catalyst through said reduction and regeneration zones in physical admixture with a minor amount relative to the quantity of said particles of cracking catalyst of fluidizable particles consisting essentially of calcined spray dried microspheres of kaolin clay impregnated with a minor amount of a platinum compound, said platinum compound being present in amount sufficient to promote the oxidation of carbon monoxide to carbon dioxide in a said regeneration zone, said impregnated microspheres having a low surface area as measured by the B.E.T. nitrogen absorption method.

2. In a process for the continous cyclic fluid catalytic cracking of hydrocarbons with a zeolitic cracking catalyst in the absence of added hydrogen in a reaction zone to produce lower boiling hydrocarbons wherein cracking results in the deposition on the fluid cracking catalyst particles of a solid deposit of combustible hydrocarbons, the catalyst particles containing said deposit are regenerated in a regeneration zone by oxidation in the presence of air at elevated temperature to burn off said deposit, and the catalyst is recycled to said reaction zone where it is used to crack hydrocarbons in the absence of added hydrogen, the improvement which comprises cycling said particles of cracking catalyst through said reaction and regeneration zones in physical admixture with particles of spray dried kaolin clay in the form of microspheres, said microspheres having been calcined at a temperature in the range of about 1000° to 2100° F., having a surface area, as measured by the B.E.T. nitrogen absorption method, in the range of about 10 to 15 $m^2/g$., a pore volume, as measured by nitrogen absorption, in the range of about 0.02 to 0.04 cc./g. and a particle size distribution such that the particles are predominantly in the size range of 20 to 150 microns, said calcined microspheres having impregnated thereon a compound of platinum in amount sufficient to promote the oxidation of carbon monoxide to carbon dioxide in a regenerator for a fluid cracking catalyst, said particles of spray dried calcined clay impregnated with platinum being present in amount within the range of 30 to 5 parts by weight to 70 to 95 parts by weight of said particles of zeolitic aluminosilicate cracking catalyst.

* * * * *